United States Patent
Chadez et al.

(12) 
(10) Patent No.: US 6,522,420 B1
(45) Date of Patent: Feb. 18, 2003

(54) PRINTER AND METHOD FOR ALTERNATELY PRINTING AND COMPRESSING DATA USING SAME PROCESSING UNIT

(75) Inventors: Clayton E. Chadez, Nampa, ID (US); Richard H. Benear, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/175,720

(22) Filed: Oct. 20, 1998

(51) Int. Cl.[7] .............................................. G06K 15/00
(52) U.S. Cl. ..................................... 358/1.15; 358/1.13
(58) Field of Search ............................... 358/1.15, 1.16, 358/1.14, 1.13, 1.12, 1.11, 1.1–1.9, 1.17, 1.18; 400/426.01–426.08, 426.12–426.14; 382/232–253

(56) References Cited

U.S. PATENT DOCUMENTS

| | | | | |
|---|---|---|---|---|
| 3,728,688 A | * | 4/1973 | Elmhurst et al. | 340/172.5 |
| 3,795,186 A | * | 3/1974 | Curtiss et al. | 101/93 C |
| 5,383,030 A | * | 1/1995 | Seo | 358/442 |
| 5,506,963 A | * | 4/1996 | Ducateau et al. | 395/200.03 |
| 5,674,012 A | | 10/1997 | Sasaki | 400/61 |
| 5,729,688 A | | 3/1998 | Claflin et al. | 358/1.15 |
| 5,768,486 A | * | 6/1998 | Sugaya | 358/1.17 |
| 5,950,044 A | * | 9/1999 | Ashiya et al. | 399/76 |

FOREIGN PATENT DOCUMENTS

| | | |
|---|---|---|
| EP | 0267125 A2 | 5/1988 |
| GB | 2251107 A | 6/1992 |

* cited by examiner

Primary Examiner—Gabriel Garcia
Assistant Examiner—King Y. Poon

(57) ABSTRACT

A printer performs both the processing and printing tasks efficiently using controller firmware with a single data path (i.e., one ASIC). The printer has a periodic print cycle in which data for one page or plane (if multi-colored) is printed during each cycle. The print cycle is typically longer than the time needed to print one page or plane. Thus, the print cycle can be segmented into a "printing phase" in which the printing mechanism prints data, and a "non-printing" phase in which the printing mechanism does not print data. The controller firmware interleaves printing operations with non-printing operations during the printing and non-printing phases of the print cycle, respectively. During the printing phase, the controller is dedicated to printing a page or plane. During the non-printing phase, the controller is free to perform other tasks, such as compressing raster data for subsequent printing. The printer is configured with a set of operating parameters that enable the controller firmware to alternate between printing and non-printing tasks (e.g., data compression). Once released from manufacturing, the printer may, in practice, not perform optimally to the specifications. Thus, another aspect of this invention is to tune the operating parameters to achieve optimal performance for a specific printer. This tuning is a self-tuning technique that is performed in post-manufacture real-time, while the printer is in operation.

11 Claims, 5 Drawing Sheets

PRINTER AND METHOD FOR ALTERNATELY PRINTING AND COMPRESSING DATA USING SAME PROCESSING UNIT

TECHNICAL FIELD

This invention relates to printers, such as laser and color laser printers. More particularly, this invention relates to methods for alternately printing and compressing data during the same engine cycle using the same processing unit.

BACKGROUND

A typical printer receives data from a host computer in a driver format, such as PCL or postscript. The printer converts the host data to a bitmap containing raster data for individual pixels to be printed. The printer compresses the raster data for storage and subsequently decompresses the raster data in real-time. The printer sends the raster data to the print engine, which prints the data onto a recording media.

Printer firmware must perform both compression and printing (or "video") operations. Ideally, these tasks are performed at the same time to preserve engine speed and overall printer throughput. With existing firmware and printing methods, one solution for achieving this ideal is to implement two application specific integrated circuits (ASICs), one to process the incoming host data and another to drive the print engine and printing mechanism to print the data. Unfortunately, implementing a second ASIC in the printer firmware adds considerable expense to the printer.

Accordingly, there is a need to design printer firmware that performs both the processing and printing tasks using only one ASIC, while maintaining an acceptable engine speed.

SUMMARY

This invention concerns a printer that performs both the processing and printing tasks efficiently using controller firmware with a single data path (i.e., one ASIC). The printer has a periodic print cycle in which data for one page or plane (if multi-colored) is printed during each cycle. The print cycle is typically longer than the time needed to print one page or plane. Thus, the print cycle can be segmented into a "printing phase" in which the printing mechanism prints data, and a "non-printing" phase in which the printing mechanism does not print data. For instance, in a laser printer, the non-printing phase is used for drum rotation to return the drum to the proper position for printing the next page or plane.

The controller firmware interleaves printing operations with non-printing operations during the printing and non-printing phases of the print cycle, respectively. During the printing phase, the controller is dedicated to printing a page or plane. During the non-printing phase, the controller is free to perform other tasks, such as compressing raster data for subsequent printing.

The printer is configured with a set of operating parameters that enable the controller firmware to alternate between printing and non-printing tasks (e.g., data compression). Once released from manufacturing, the printer may, in practice, not perform optimally to the specifications. Thus, another aspect of this invention is to tune the operating parameters to achieve optimal erformance for a specific printer. This tuning is a self-tuning technique that is performed in post-manufacture real-time, while the printer is in operation.

BRIEF DESCRIPTION OF THE DRAWINGS

The same reference numbers are used throughout the figures to reference like components and features.

DETAILED DESCRIPTION

This invention relates to printers and is described in the context of laser printers, and particularly color laser printers. Aspects of this invention may also be implemented for other types of printers, such as inkjet printers and color thermal printers.

Exemplary Printing System

Figure 1:
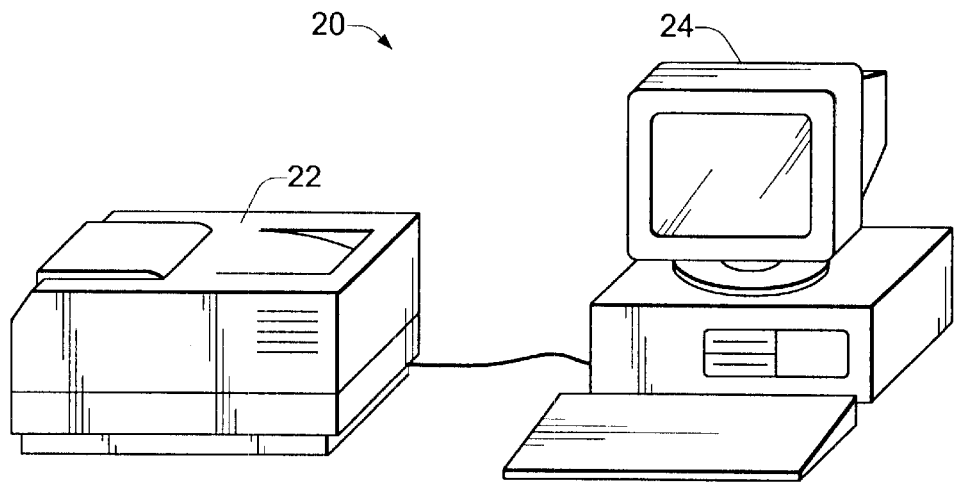
FIG. 1 is a side view of a printing system having a printer and workstation.

FIG. 1 shows a printing system 20 having a color laser printer 22 connected to a host workstation 24 via a direct connection or over a network. The workstation 24 outputs host data to the printer 22 in a driver format, such as PCL or postscript. The printer 22 converts the host data to a bitmap containing raster data for individual pixels to be printed. The printer 22 then compresses the raster data for storage. At print time, the printer decompresses the raster data in real-time and sends it to the engine where it is printed onto a recording media.

Figure 2:
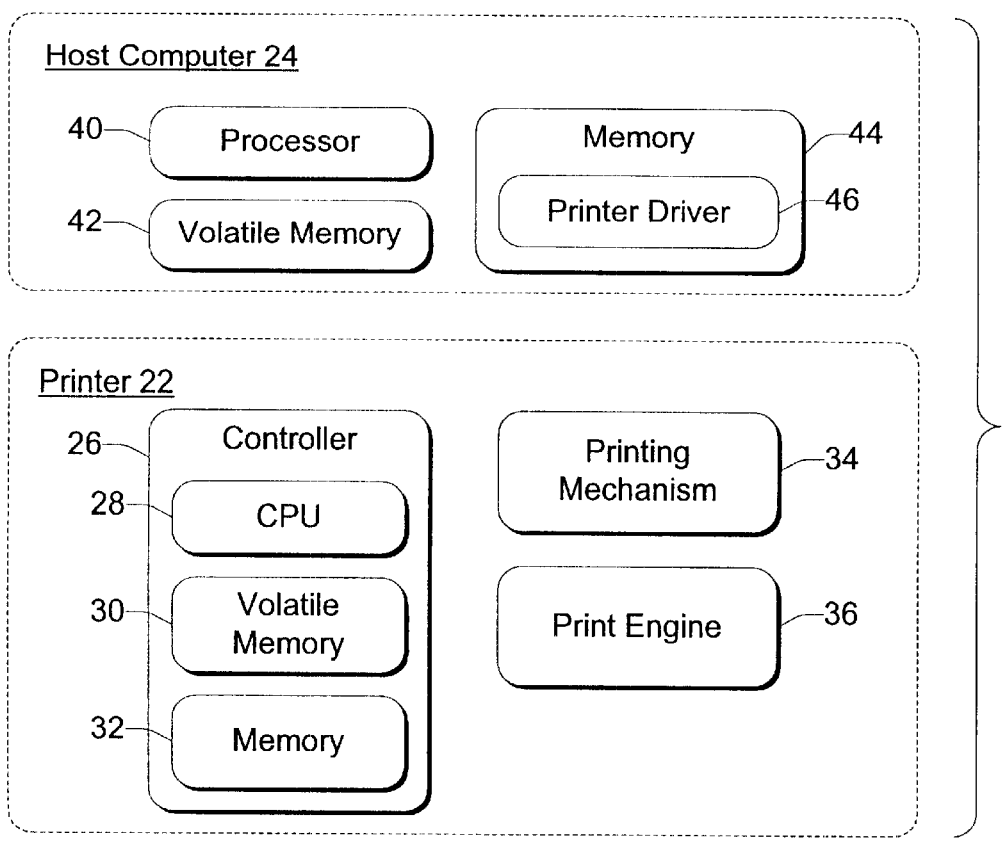
FIG. 2 is a block diagram of the printing system.

FIG. 2 shows the system 20 in more detail. The printer 22 has a controller 26 that processes and prints the host data. The controller 26 has a data processing unit or CPU 28, a volatile memory 30 (i.e., RAM), a non-volatile memory 32 (e.g., ROM, Flash). The printer 22 also has printing mechanism 34, such as a rotatable drum. In non-laser printers, the printing mechanism may have other embodiments, such as one or more print heads mounted on a shuttle carriage. The printer 22 also has a print engine 36 that is responsible for taking the raster data and causing the printing mechanism 34 to deposit a corresponding image onto the recording media.

The controller 26 controls operation of the printing mechanism 34 and the print engine 36. The controller's CPU 28 is preferably implemented as an Application Specific Integrated Circuit (ASIC) that is designed to support serial and parallel I/O functionality with the host, compress and decompress the raster data, communicate with the print engine, and send the host data to the engine.

The workstation 24 has a processor 40, a volatile memory 42 (i.e., RAM), and a non-volatile memory 44 (e.g., ROM, hard disk, floppy disk, CD-ROM, etc.). The workstation 24 may be implemented, for example, as a general-purpose computer, such as a desktop personal computer, a laptop, a server, and so forth. The workstation 24 implements a software-based printer driver 46 that is stored in non-volatile memory 44 and executed on the processor 40. The printer driver 46 configures print data into an appropriate format (e.g., PCL, postscript, etc.) and outputs the formatted data to the printer 22.

The printer controller 26 performs the dual task of processing the host data in preparation for printing and facilitating the actual printing of the data. Ideally, the printer would be configured with two controllers (i.e., two ASICs), one to process the incoming host data and another to drive the print engine and printing mechanism to print the data. However, this ideal option is not desirable in the marketplace due to the expense of adding a second controller to the printer.

Accordingly, the printer of this invention is designed to perform both the processing and printing tasks efficiently using only a single controller 26. The printer has a periodic print cycle in which the data for one page or plane (if multi-colored) is printed during each cycle. The print cycle is typically longer than the time needed to print one page or plane. Thus, the print cycle can be said to have a "printing phase" in which the printing mechanism prints data, and a "non-printing" phase in which the printing mechanism is not printing data. For instance, in a laser printer, the non-printing phase is used for drum rotation to return the drum to the proper position for printing the next page or plane.

The printer interleaves printing operations with non-printing operations during the printing and non-printing phases of the print cycle, respectively. During the printing phase, the controller is dedicated to the task of printing a page or plane. During the non-printing phase, the controller is free to perform other tasks. The printer takes advantage of the non-printing phase to compress the raster data for a subsequent printing phase.

General Operation

For discussion purposes, the general operation of a four pass color printer is described. The techniques described below are equally applicable to monochrome printers as well.

The print engine 36 of color printer 22 requires four "passes" or drum rotations for one color page. On each rotation of the drum, the printer deposits a plane of different color toner, such as Cyan, Magenta, and Yellow (CMY), onto an intermediate transfer device. During the last pass, the transfer device transfers all toner colors to the recording media.

The time taken by the printer to make all four passes depends on the engine speed. A conventional color laser printer employs a print engine that prints at a speed of four page per minute (ppm) or one page every 15 seconds. This means that the printer has a total of 3.75 seconds available for each of the four passes.

In each pass, two operations are performed. First, the video data for the corresponding color plane is sent to the engine. Second, the intermediate transfer device rotates back to its starting position and the toner carousel rotates to its next position. Approximately two-thirds of the time is spent transferring data with the remainder to perform the setup for the next plane. For example, in an HP Laserjet color printer, approximately 2.28 seconds is used to send one full plane of color data for a normal 8.5"×11" letter size paper. With each plane having a 3.75 seconds, this leaves approximately 1.47 seconds for each pass where the controller is not being used to facilitate printing, and therefore can be redirected to compress raster data.

Figure 3:
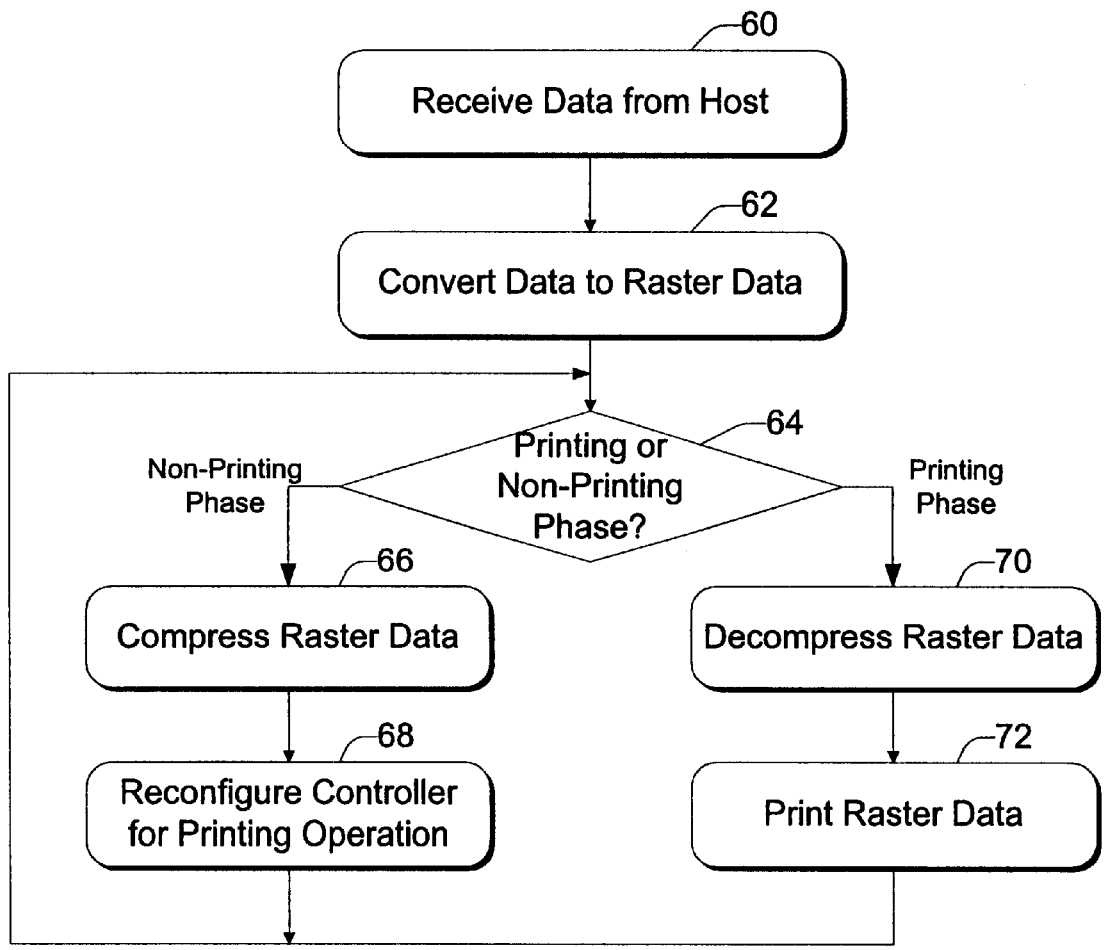
FIG. 3 is a flow diagram showing steps in a general method for operating a printer.

FIG. 3 shows a flow diagram of the general steps in the printer operation of interleaving compression and printing tasks. At step 60, the color printer receives data from the host computer. At step 62, the controller 26 converts the host data to raster data. At step, 64, the printer determines whether it is in the printing phase or the non-printing phase of the print cycle.

When the printer is in the non-printing phase, the controller 26 performs compression tasks to compress the raster data that will later be used in the printing phase (step 66). According to an exemplary set of operating parameters, this task consumes approximately 1.37 seconds of the print cycle. Near the end of the non-printing phase, the controller 26 is reconfigured for the upcoming printing tasks (step 68), which takes approximately 0.1 second of the print cycle.

When the printer is in the printing phase, the controller 26 facilitates the printing operation. The controller decompresses the previously compressed raster data on the fly (step 70) and directs operation of the print engine and drum to print the raster data (step 72). The printing operation consumes approximately 2.28 seconds of the print cycle.

According to this method, the printer controller 26 alternates between compression and printing operations, depending upon the phase of the print cycle. While FIG. 3 provides a more general overview of the printer operation, FIGS. 4 and 5 provide a detailed example of the printer operation of a color laser printer.

Exemplary Timing Illustration

Figure 4:
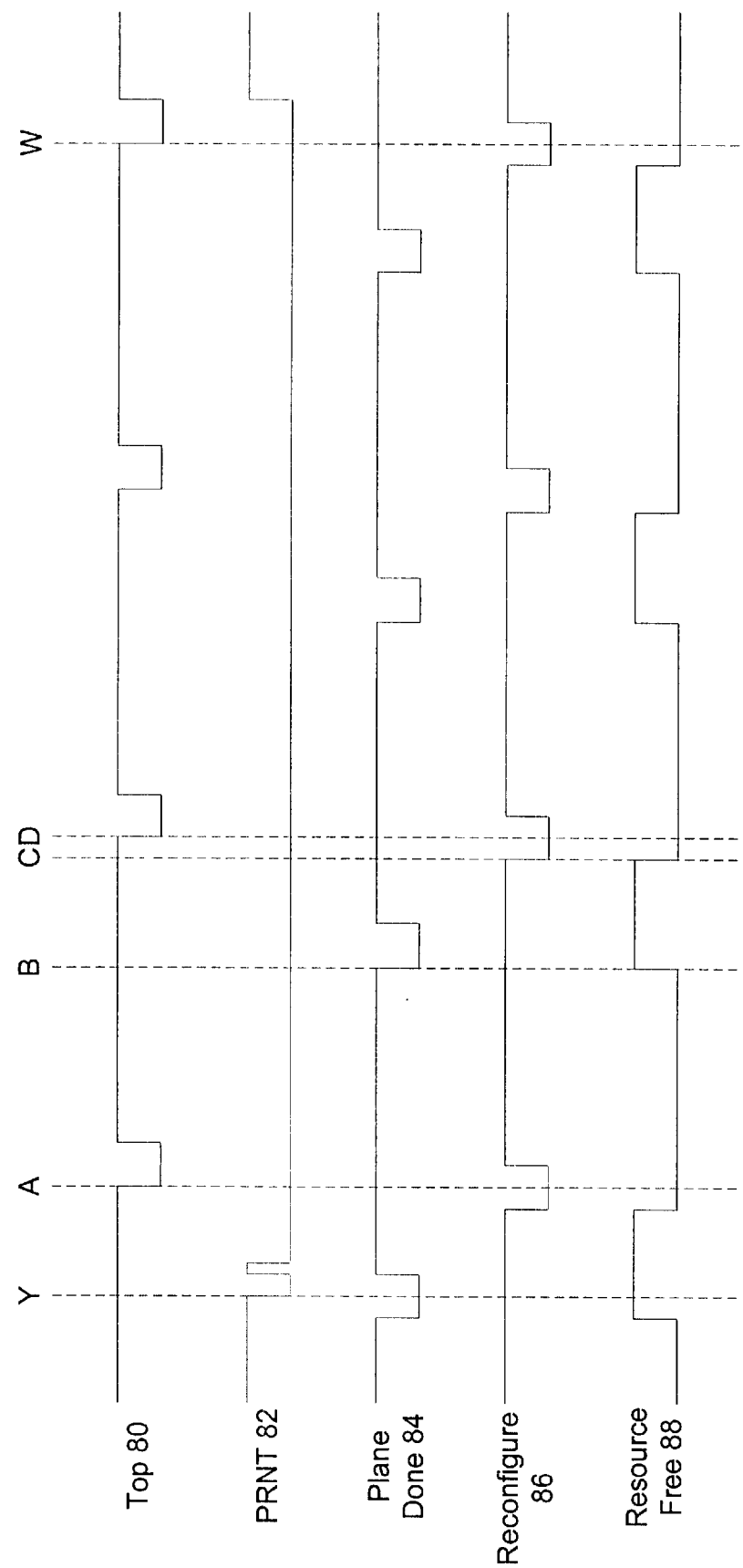
FIGS. 4 and 5 are timing diagrams showing an exemplary detailed operation of a color laser printer to interleave printing and compression tasks using the same controller.
Figure 5:
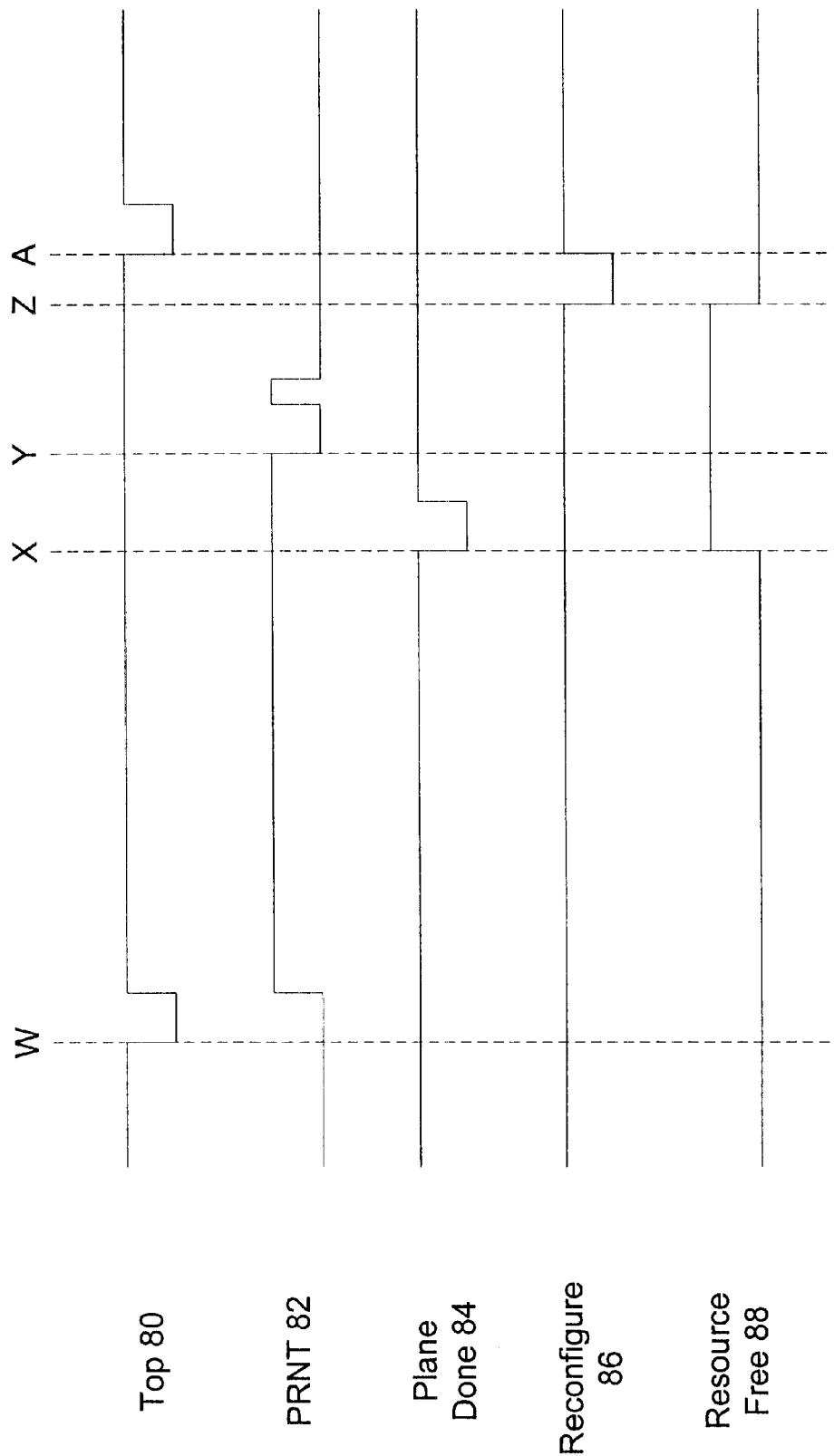

FIGS. 4 and 5 show exemplary timing diagrams for operating a 4-ppm color laser printer. The printer makes four passes per page, as described above. FIG. 4 shows the four passes to deposit the three planes of color and transfer them to the recording media, and FIG. 5 shows the fourth pass in detail.

The "Top" signal 80 refers to the top of form when the controller 26 begins sending raster data to the print engine. The "PRNT" signal 82 instructs the print engine to begin. The "Plane Done" signal 84 identifies when the current plane, which began with the "Top" signal 80, is completed. The "Reconfigure" signal 86 establishes when the controller begins preparation for an upcoming printing phase. The "Resource Free" waveform 88 demonstrates via the high conditions when the controller is available for activities other than printing, such as compression activities. More specifically, the controller 26 is free to perform compression activities during the interval between the plane done signal 84, when the printing operation for the plane is completed, and the subsequent reconfigure signal 86, when the controller prepares for the next plane.

With reference to FIG. 4, the first "Top" pulse at time A marks the start of the first plane of the first page. The controller begins sending data to the print engine at time A. It is noted that prior to the start of the first plane in this page, the print signal at time Y has already been triggered. At time B, the plane done signal 84 marks the completion of the plane. At time C, the reconfigure signal 86 instructs the controller to begin preparation of the upcoming printing phase, followed by the next top signal at time D. Time W marks the fourth and last top signal for the four-pass process and is shown here for reference to the timing diagram of FIG. 5.

The print cycle is defined by the time interval A-D; that is, the time between consecutive top signals 80 at times A and D. The time interval A-B designates the printing phase of the print cycle and the time interval B-D designates the non-printing phase of the print cycle. The controller 26 performs printing operations during the printing phase A-B. The controller 26 is then free to perform other operations in the non-printing phase B-D. Continuing the above example, the print cycle A-D is approximately 3.75 seconds for normal 8.5"×11" letter size paper, the printing phase A-B is approximately 2.28 seconds, and the non-printing phase B-D is approximately 1.47 seconds.

The non-printing phase B-D is segregated into a first interval extending from time B of the plane done signal 84 to time C of the reconfigure signal 86, and a second interval from time C of the reconfigure signal 86 to time D of the next top signal 80. During the first interval, the processor 26 performs non-printing operations such as data compression.

During the second interval C-D, the processor 26 prepares for the upcoming printing operations. The first interval is approximately 1.37 seconds, whereas the second interval is approximately 0.1 second.

FIG. 5 shows the fourth pass in detail. It involves the interval from time W, the top signal 80 for fourth plane, to time A, the top signal 80 for first plane of next page. At time X, the plane done signal 84 marks the completion of the fourth plane. At time Y, the print signal 82 is triggered to mark the start of a next page. At time Z, the reconfigure signal 86 instructs the controller to begin preparation of the upcoming printing phase for the first plane of the next page, which begins at time A. In this timing diagram, the print cycle W-A contains a printing phase W-X and a non-printing phase X-A. The latter phase is separated into a first interval X-Z, in which the controller performs compression operations, and a second interval Z-A, in which the controller prepares for the next page.

The time interval W-Z in FIG. 5 is based on the state of the print engine and can vary from 3.75 seconds to 15 seconds. Another advantage of this invention is that most of this time is made available for non-printing operations (e.g., compression).

Real-time Tuning of Operating Parameters

The above explanation assumes that the printer operates within its specifications. However, the printer may, in practice, not perform optimally to the specifications for a number of different reasons. Accordingly, another aspect of this invention is to tune the operating parameters to achieve optimal performance for a specific printer. This tuning is performed in post-manufacture real-time, while the printer is in operation.

Figure 6:
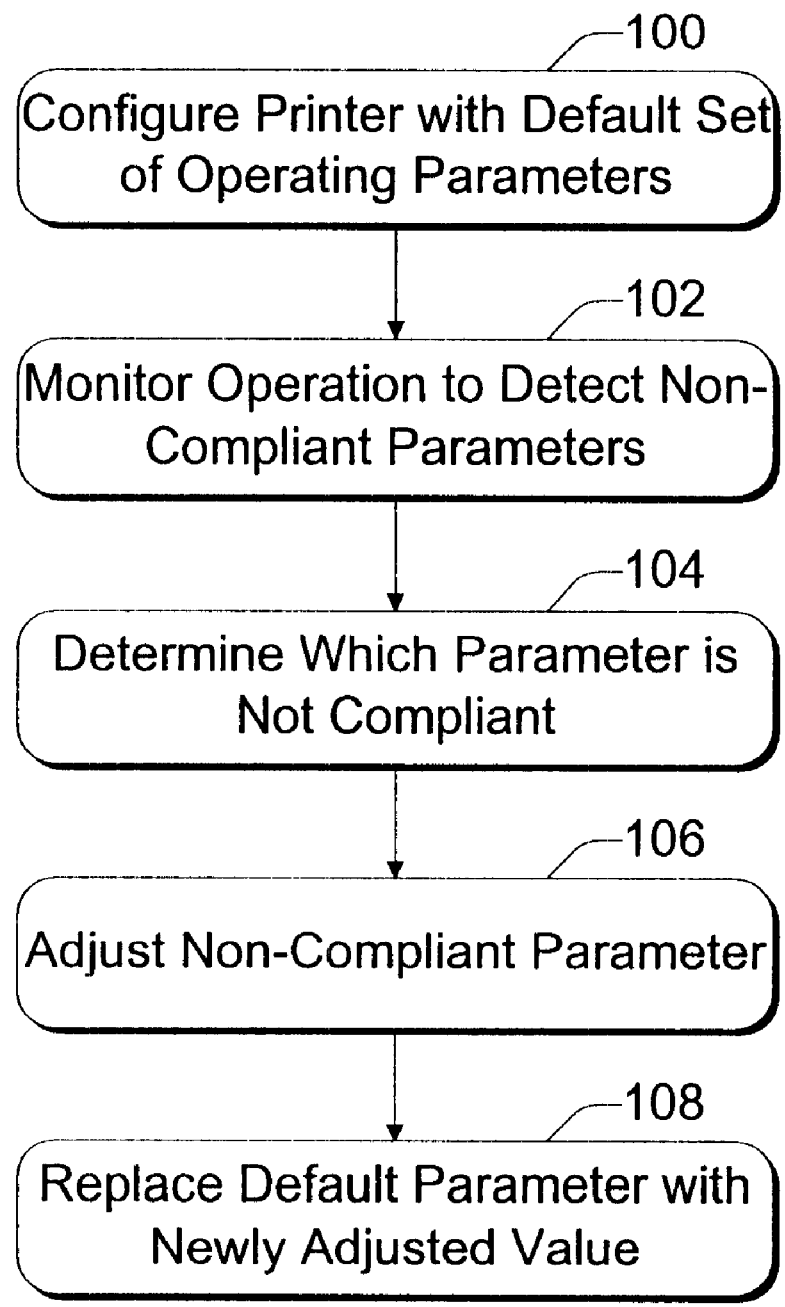
FIG. 6 is a flow diagram showing steps in a method for tuning printer operating parameters.

FIG. 6 shows steps in a method for tuning the printer's operating parameters. At step 100, the printer is initially configured with a set of parameters. For example, the tunable parameters with respect to the timing diagram of FIG. 5 include a print cycle W-A, a printing phase W-X, a Top to Print interval W-Y, and a non-printing phase X-A (which includes a resource free interval X-Z and a reconfiguration interval Z-A). The tuning parameters are stored in non-volatile memory 32. Table 1 summarizes the tunable parameters.

TABLE 1

| Parameter | Value |
| --- | --- |
| Print Cycle W-A | 3.75 seconds |
| Printing Phase W-X | ≦2.28 seconds |
| Top to Print Interval W-Y | 2.50 seconds |
| Non-Printing Phase B-D | 1.47 seconds |
| -Resource Free Interval B-C | 1.37 seconds |
| -Reconfiguration Interval C-D | 0.10 second |

At step 102, the controller 26 monitors operation of the printer and attempts to detect when one of the parameters is not in compliance. Non-compliance is defined by the manufacturer to a desired set of tolerance levels for each parameter. If a failure occurs as a result of one of these values being inaccurate or less than optimal, the controller determines which parameter is responsible for the failure (step 104).

For instance, if the print signal 82 fails to trigger within the 2.50 second window allowed by the Top to Print interval W-Y, the printer transitions to a cleaning cycle that lasts approximate 12 seconds. Thus, the print cycle W-A is expanded to 12 seconds. This adjustment is summarized as follows:

If Interval W-Y≦2.5, Print Cycle W-A=3.75 seconds; and
If Interval W-Y>2.5, Print Cycle W-A<12 seconds;

These conditions set the time at which the reconfiguration signal 86 is to trigger. Performance is lost when the Top to Print interval W-Y exceeds 2.5 seconds, which in turn forces the reconfiguration signal 86 to slip by up to 12 seconds.

At step 106, the controller 26 attempts to adjust parameters that result in performance degradation to reduce the probability of future failures. The adjusted parameter is saved to the non-volatile memory 32 to replace the non-optimal value (step 108). This process can be iterative to reach an optimal value for the particular printer.

Suppose, for example, that in a particular printer, the time Z of the reconfiguration signal 86 occurs after the next top signal 80 at time A. This may occur, for instance, if the print cycle only runs for 3.6 seconds between consecutive top signals, rather than the specified 3.75 seconds. The reconfiguration signal 86, which is designed to trigger approximately 0.1 second before the next top signal, or 3.65 seconds after the last top signal, does not trigger in time for the printer to prepare for the next pass. In this case, the printer returns a "service error".

The controller detects this inaccuracy and determines that the parameter of 3.75 seconds that is suppose to reflect the top-to-top print cycle is actually off at least 0.15 second. As a result, the controller reduces the print cycle parameter by at least 0.15 second, or say perhaps 0.3 second, to tune the parameter. This places the print cycle parameter at 3.45 seconds, which is stored in memory in place of the default 3.75 seconds.

Now, when the printer runs through a subsequent print cycle at its adjusted 3.6 second duration, the reconfigure signal 86 is set to trigger 0.1 second before the print cycle parameter of 3.45 seconds, or at 3.35 seconds from the first top signal. This allows sufficient time for the reconfigure signal 86 to trigger before the next top signal, thereby improving the performance of the printer.

The on-the-fly tuning advantageously brings the printer into optimal performance. The adjustments are made only at the expense of shortening the time at which the CPU is made available for non-printing tasks. In the last example, the reduction of the print cycle by 0.3 second effectively shaves 0.3 second from the resource free time, reducing it from 1.47 seconds to 1.07 seconds. Such a reduction has little impact on the controller's ability to compress the raster data in a timely manner for a subsequent plane.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A laser printer comprising:

a printing mechanism, having a rotatable printing drum;

an engine to drive the printing mechanism during an engine cycle, wherein the engine operates at approximately constant speed thereby producing engine cycles of approximately equal duration, the engine cycle comprising a printing phase and a non-printing phase such that the engine cycle has a default time T1, the printing phase has a default time T2 and the non-printing phase has a default time T3, such that T2+T3≈T1 and T2>T3;

a controller coupled to control the engine and the printing mechanism, the controller configured to perform printing operations during the printing phase of the engine cycle;

the controller additionally configured to compress data during a first interval of the non-printing phase of the engine cycle and to reconfigure in preparation for the printing operations during a second interval of the non-printing phase of the engine cycle;

the controller additionally configured to decompress the data, during the printing phase of the engine cycle following the non-printing phase, and to cause the drum to deposit images according to the data onto a recording media; and the controller additionally configured to make an adjustment, where the non-printing phase of the engine cycle exceeds a start of the printing phase of the engine cycle, the adjustment reducing the non-printing phase by a time that the non-printing phase exceeds the start of the printing phase.

2. A laser printer as recited in claim 1, embodied as a color laser printer.

3. A laser printer comprising:

a rotatable printing drum;

an engine to rotate the drum one revolution per engine cycle, the engine cycle being segmented into a printing phase and a non-printing phase such that the engine cycle has a default time T1, the printing phase has a default time T2 and the non-printing phase has a default time T3, such that $T2+T3 \approx T1$ and $T2>T3$;

a controller coupled to control the engine and the drum, the controller configured to receive host data from a host computer and to convert the host data into print data;

the controller configured to compress the print data dung a first interval of the non-printing phase and to reconfigure in preparation for the printing phase during a second interval of the non-printing phase;

the controller additionally configured to decompress, during the printing phase of the engine cycle following the non-printing phase, the print data and to cause the drum to deposit images according to the print data onto a recording media; and the controller additionally configured, where the printing phase exceeds the default time T2, to wait at least one full engine cycle before beginning a subsequent printing phase.

4. A printer as recited in claim 3, wherein the non-printing phase default time T3 comprises a compression time T4 in which the controller compresses the print data and a reconfigure time T5 in which the controller reconfigures in preparation for an upcoming printing phase, such $T4+T5 \approx T3$.

5. A printer as recited in claim 4, where in the event that any one of the printing phase, the controller compression, and the controller reconfiguration exceeds respective times T2, T4, and T5, the controller adjusts the time that has been exceeded by an amount at least equal to a length that the time has been exceeded.

6. A laser printer comprising:

printing mechanism means for rotating a printing drum;

engine means to drive the printing mechanism means during an engine cycle, wherein the engine means operates at approximately constant speed thereby producing engine cycles of approximately equal duration, the engine cycles comprising a printing phase and a non-printing phase such that the engine cycles have a default time T1, the printing phase has a default time T2 and the non-printing phase has a default time T3, such that $T2+T3 \approx T1$ and $T2>T3$;

controller means, coupled to control the engine means and the printing mechanism means, for performing printing operations during the printing phase of the engine cycle;

the controller means additionally configured for compressing data during a first interval of the non-printing phase of the engine cycle and to reconfigure in preparation for the printing operations during a second interval of the non-printing phase of the engine cycle;

the controller means additionally configured for decompressing the data, during the printing phase of the engine cycle following the non-printing phase, and to cause the printing drum to deposit images according to the data onto a recording media; and the controller means additionally configured to make an adjustment, where the non-printing phase of the engine cycle exceeds a start of the printing phase of the engine cycle, the adjustment reducing the non-printing phase by a time that the non-printing phase exceeds the start of the printing phase.

7. A method for operating a laser printer, comprising:

rotating a printing drum within a printing mechanism;

driving an engine to operate the printing mechanism during an engine cycle, wherein the engine operates at approximately constant speed thereby producing engine cycles of approximately equal duration, the engine cycles comprising a printing phase and a non-printing phase such that the engine cycles have a default time T1, the printing phase has a default time T2 and the non-printing phase has a default time T3, such that $T2+T3 \approx T1$ and $T2>T3$;

coupling a controller to control the engine and the printing mechanism, the controller configured to perform printing operations during the printing phase of the engine cycle;

additionally configuring the controller to compress data during a first interval of the non-printing phase of the engine cycle and to reconfigure in preparation for the printing operations during a second interval of the non-printing phase of the engine cycle;

additionally configuring the controller to decompress the data, during the printing phase of the engine cycle following the non-printing phase, and to cause the drum to deposit images according to the data onto a recording media; and additionally configuring the controller to make an adjustment, where the non-printing phase of the engine cycle exceeds a start of the printing phase of the engine cycle, the adjustment reducing the non-printing phase by a time that the non-printing phase exceeds the start of the printing phase.

8. A method as recited in claim 7, further comprising adjusting a duration of the printing phase and/or the non-printing phase.

9. A processor-readable medium comprising processor-executable instructions for operating a laser printer according to the method as recited in claim 7.

10. A processor-readable medium comprising processor-executable instructions for operating a laser printer, the processor-executable instructions comprising instructions for:

using an engine to rotate a printing drum one revolution per engine cycle, the engine cycle being segmented into a printing phase and a non-printing phase such that the engine cycle has a default time T1, the printing phase has a default time T2 and the non-printing phase has a default time T3, such that T2+T3≈T1 and T2>T3;

coupling a controller to control the engine and the printing drum, the controller configured to receive host data from a host computer and to convert the host data into print data;

configuring the controller to compress the print data during a first interval of the non-printing phase and to reconfigure in preparation for the printing phase during a second interval of the non-printing phase;

additionally configuring the controller to decompress, during the printing phase of the engine cycle following the non-printing phase, the print data and to cause the printing drum to deposit images according to the print data onto a recording media; and additionally configuring the controller, where the printing phase exceeds the default time T2, to wait at least one full engine cycle before beginning a subsequent printing phase.

11. A processor-readable medium as recited in claim 10, comprising further instructions for:

adjusting a duration of the printing phase and/or the non-printing phase.

* * * * *

UNITED STATES PATENT AND TRADEMARK OFFICE
CERTIFICATE OF CORRECTION

PATENT NO. : 6,522,420 B1
DATED : February 18, 2003
INVENTOR(S) : Chadez et al.

It is certified that error appears in the above-identified patent and that said Letters Patent is hereby corrected as shown below:

Column 7,
Line 32, delete "dung" and insert therefor -- during --.

Signed and Sealed this

Thirteenth Day of January, 2004

JON W. DUDAS
*Acting Director of the United States Patent and Trademark Office*